United States Patent
Cholewczynski et al.

[19]

[11] Patent Number: 6,065,559

[45] Date of Patent: May 23, 2000

[54] SUPPORT STRUCTURE FOR A VEHICLE POWERTRAIN

[75] Inventors: Ludwik Cholewczynski, Rochester Hills; William Maciejka, Jr., Troy, both of Mich.

[73] Assignee: Chrysler Corporation, Auburn Hills, Mich.

[21] Appl. No.: 09/158,703

[22] Filed: Sep. 22, 1998

[51] Int. Cl.$^7$ ........................................... F16F 1/14
[52] U.S. Cl. ........................ 180/297; 180/312; 74/607
[58] Field of Search ........................ 180/312, 346, 180/377; 74/607; 123/192.1

[56] References Cited

U.S. PATENT DOCUMENTS

| | | | |
|---|---|---|---|
| 4,381,043 | 4/1983 | Fukushima | 180/300 |
| 4,387,605 | 6/1983 | Grey et al. | 74/694 |
| 4,899,843 | 2/1990 | Takano et al. | 180/312 |
| 4,903,791 | 2/1990 | Cameron et al. | 180/252 |

*Primary Examiner*—Brian L. Johnson
*Assistant Examiner*—Tony Winner
*Attorney, Agent, or Firm*—Kenneth H. Maclean

[57] ABSTRACT

A transversely mounted vehicle powertrain includes a transmission differential encased in a housing, a half shaft bearing support, and a link shaft extending between the transmission differential housing and the half shaft bearing support. An inventive tubular member encircles the link shaft to increase the lateral ridigity of the powertrain. A bracket is attached to one end of the tubular member and is mounted to the transmission differential housing. The opposite end of the tubular member is secured to the half shaft bearing support. In the preferred embodiment of the present invention, the tubular member, the bracket, and the half shaft bearing support are cast as a single, integral metal piece.

6 Claims, 3 Drawing Sheets

SUPPORT STRUCTURE FOR A VEHICLE POWERTRAIN

FIELD OF THE INVENTION

The subject invention relates to a support structure for a vehicle powertrain.

BACKGROUND OF THE INVENTION

Vehicle manufacturers are continuously searching for ways to reduce noise created by the engine and the powertrain of a vehicle. One way to reduce powertrain vibration and noise is to increase or improve the rigidity of the powertrain. As a result, stiffening brackets have been externally mounted to the housing of some vehicle powertrains.

Although these prior art brackets reduce vibration and noise, they have several shortcomings. During assembly or service of the vehicle, the installation of these external brackets may be overlooked or, if installed, these external brackets may be improperly torqued causing greater vibration and noise concerns. Additionally, the packaging space in the engine compartment of most modern vehicles is extremely limited. Often, there is simply not sufficient packaging space in the engine compartment to install externally mounted stiffening brackets on the housing of the powertrain. Accordingly, it would be desirable to provide a support structure which reduces powertrain vibration and noise and which may be packaged in an engine compartment having limited packaging space.

SUMMARY OF THE INVENTION

A transversely mounted vehicle powertrain includes a transmission differential encased in a housing, a half shaft bearing support, and a link shaft extending between the transmission differential housing and the half shaft bearing support. An inventive tubular member encircles the link shaft to increase the lateral ridigity of the powertrain. A bracket is attached to one end of the tubular member and is mounted to the transmission differential housing. The opposite end of the tubular member is secured to the half shaft bearing support. In one embodiment of the present invention, the tubular member, the bracket, and the half shaft bearing support are cast as a single, integral metal piece.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
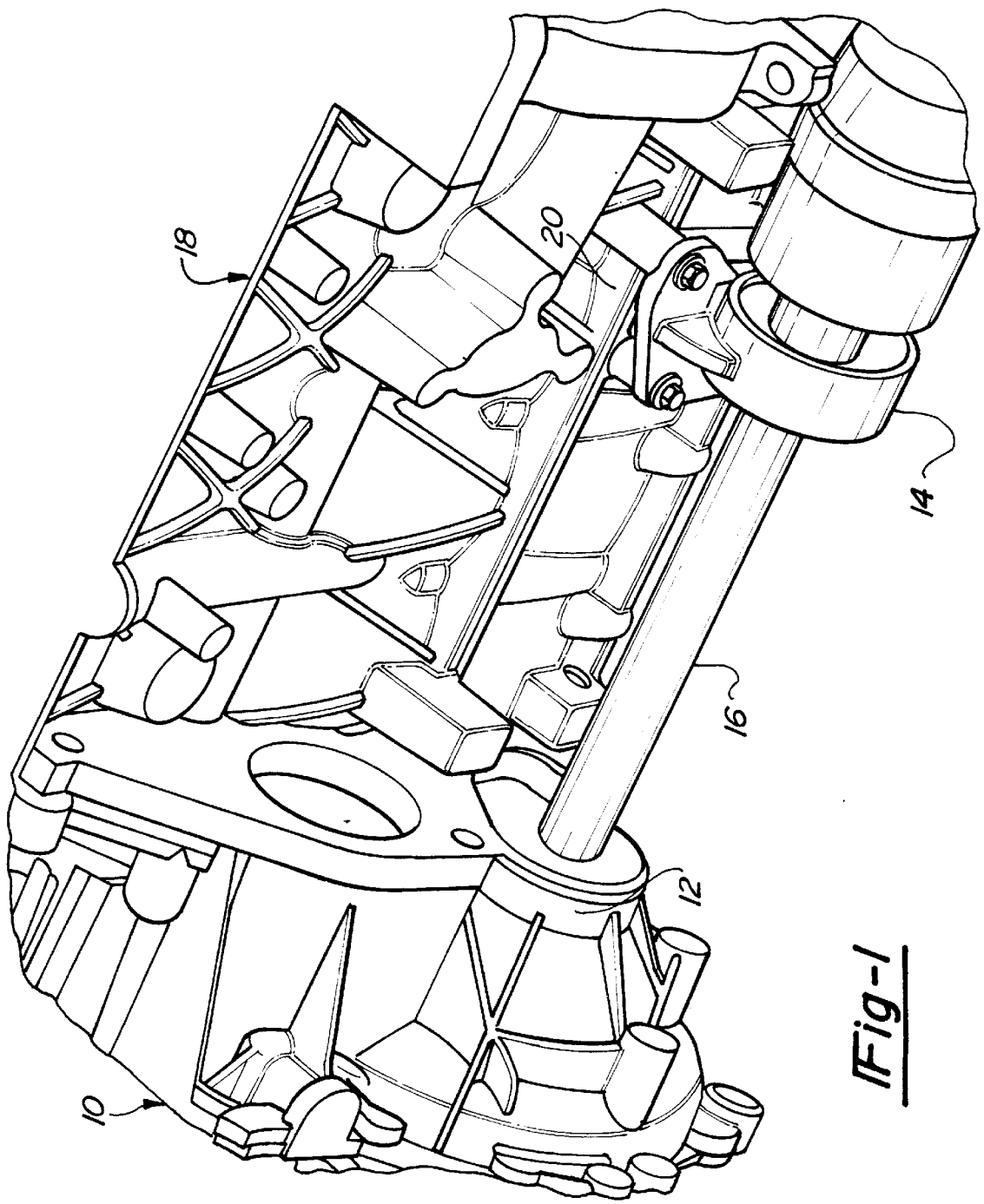
FIG. 1 is a fragmentary perspective view of a vehicle powertrain having a link shaft extending between a transmission differential and a half shaft bearing support.

Referring to the Figures, wherein like numerals indicate like or corresponding parts throughout the several views, FIG. 1 shows a fragmentary perspective view of a vehicle powertrain or transmission 10 having a transmission differential covered by a housing 12, a half shaft bearing support 14, and a link shaft 16. The link shaft 16 extends between the transmission differential and the half shaft bearing support 14. Typically, a link shaft 16 is required in a transversely mounted or extended powertrain 10, as shown in FIG. 1, having a pair of equal length drive shafts to link or transfer rotational torque from the powertrain 10 to one of the drive shafts. The half shaft bearing support 14 is designed to rotatably support one end of the link shaft 16. As shown in FIG. 1, the powertrain 10 is coupled to an engine 18 having an engine block 20.

Figure 2:
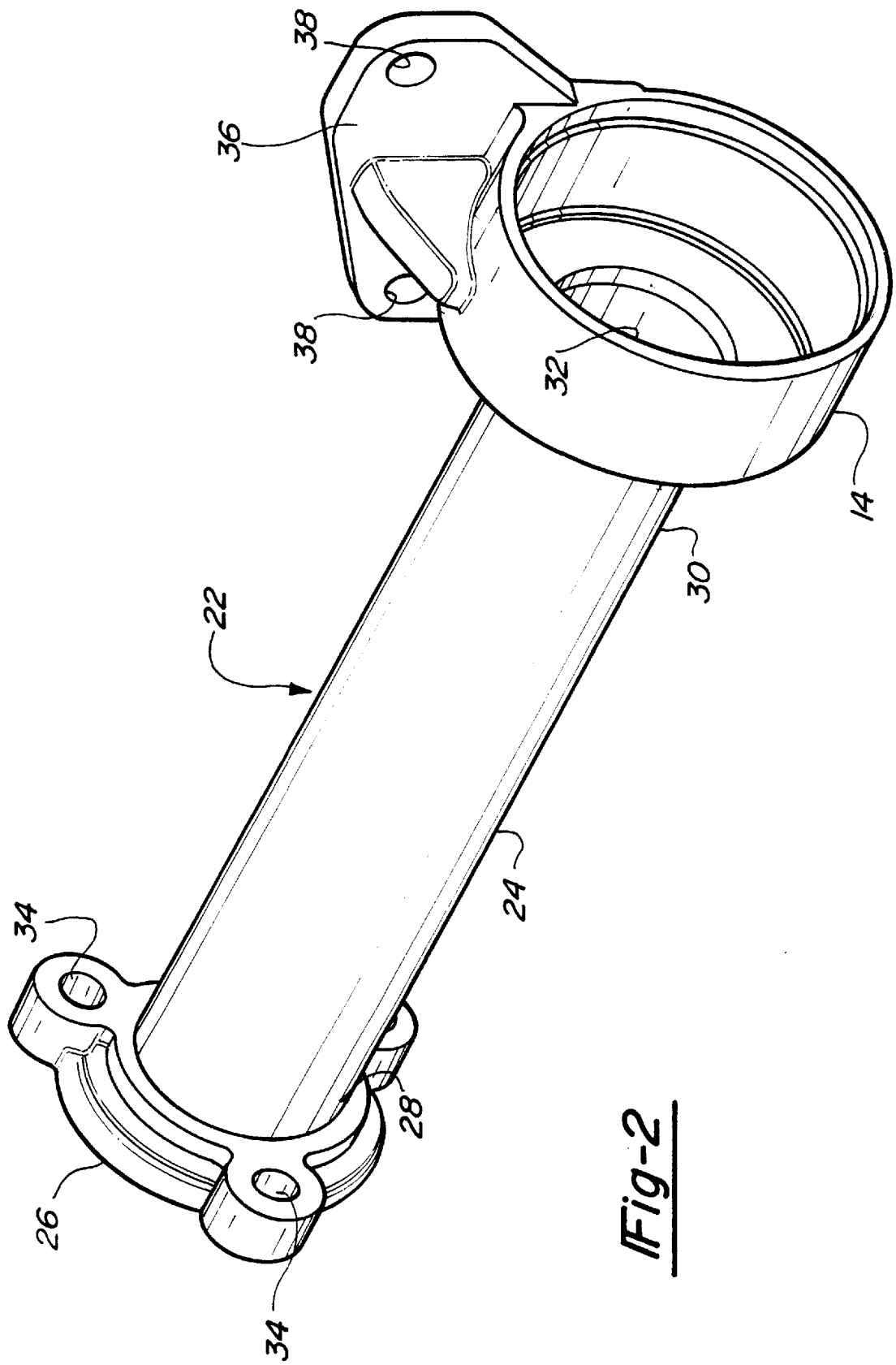
FIG. 2 is a perspective view of a support structure for the vehicle powertrain in accordance with the present invention.

FIG. 2 is a perspective view of a support structure 22 for the powertrain 10 in accordance with the present invention. When installed, the support structure 22 is designed to improve or increase the lateral rigidity of the powertrain 10. The support structure 22 includes a tubular member 24 and a bracket 26 attached to one end 28 of the tubular member 24. The opposite end 30 of the tubular member 24 is secured to the half shaft bearing support 14. The tubular member 24 includes an inner axial hollow portion 32 adapted to receive the link shaft 16. The bracket 26 includes a plurality of mounting holes 34 adapted to receive a fastener, such as a bolt, screw, stud, or other similar fastening device. The half shaft bearing support 14 includes a mounting plate 36 having a plurality of mounting apertures 38 adapted to receive a fastener, such as a bolt, screw, stud, or other similar fastening device. In the preferred embodiment of the present invention, the half shaft bearing support 14, including the mounting plate 36, and the support structure 22, including the tubular member 24 and the bracket 26, are cast as a single, integral piece as shown in FIG. 2. Typically, the integral piece is manufactured from a metal, such as steel or aluminum.

Figure 3:
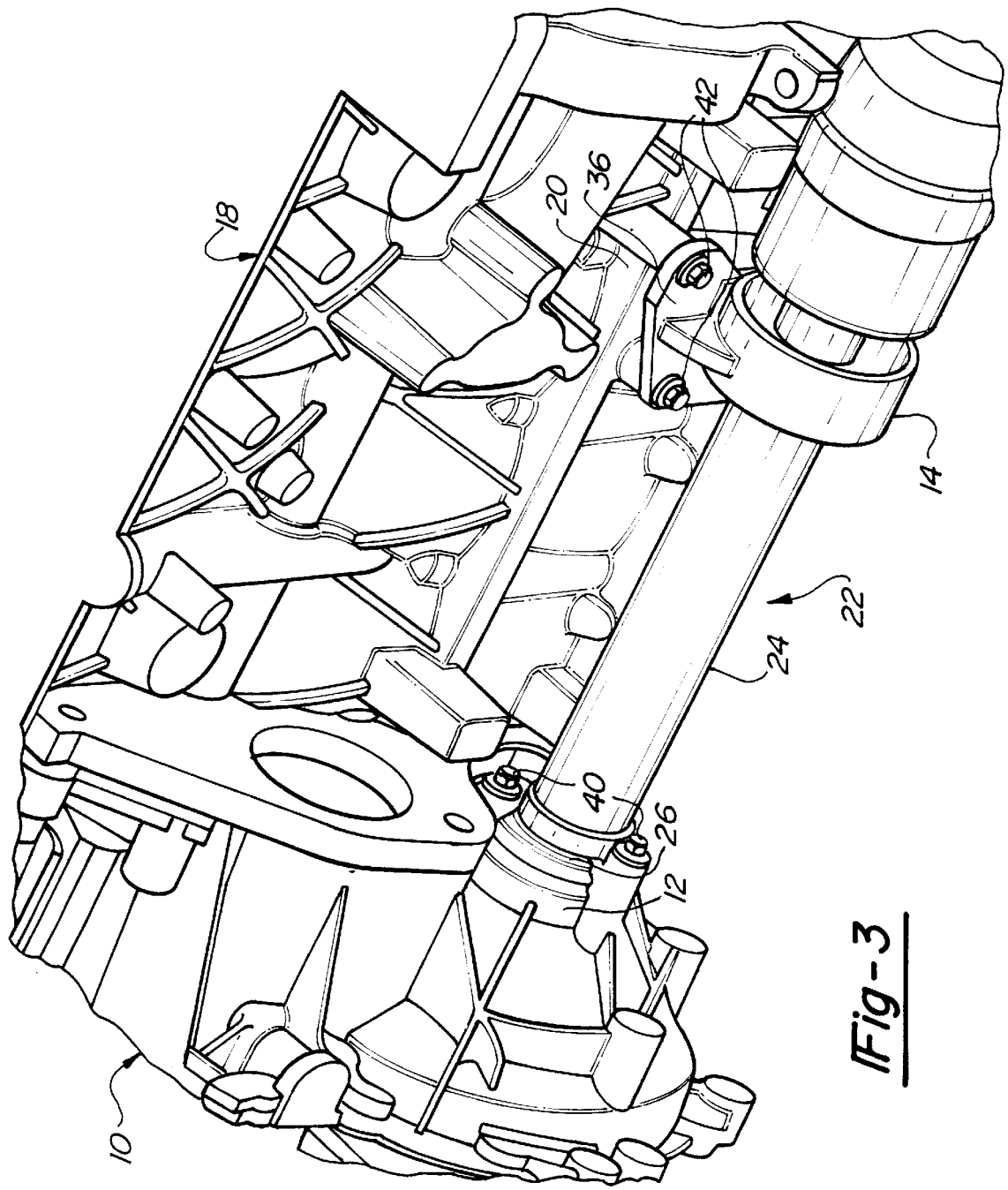
FIG. 3 is a fragmentary perspective view of the support structure installed on the vehicle powertrain.

FIG. 3 is a fragmentary perspective view of the support structure 22 installed on the powertrain 10. When the support structure 22 is fully installed, the tubular member 24 encircles the link shaft 16 and the bracket 26 is mounted to the transmission differential housing 12. The bracket 26 of the support structure 22 is attached to the transmission differential housing 12 with fasteners 40. The mounting plate 36 of the half shaft bearing support 14 is mounted to the block 20 of the engine 18 with fasteners 42.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A powertrain mounted transversely in a vehicle, said powertrain comprising:

a transmission differential encased in a housing;

a half shaft bearing support;

a link shaft extending between said transmission differential housing and said half shaft bearing support;

a tubular member encircling said link shaft for increasing the lateral ridigity of the powertrain;

a bracket attached to one end of said tubular member mounted to said transmission differential housing; and the opposite end of said tubular member secured to said half shaft bearing support.

2. A powertrain as set forth in claim 1 wherein said tubular member, said bracket, and said half shaft bearing support are cast as a single, integral piece.

3. A powertrain as set forth in claim 1 including an engine, said powertrain being coupled to said engine, and said half shaft bearing support being mounted to said engine.

4. In association with a transversely extending combination engine and transmission, a support structure for stiffening a link shaft extending between the transmission differential and the half shaft bearing support, comprising:

an elongated tubular support member;

a bracket attached to one end of said tubular support member and secured to the differential housing; and the opposite end portion of said tubular support member secured to the half shaft bearing support, wherein said tubular support member encircles the link shaft and increases the lateral bending frequency of the combination link shaft and tubular support member.

5. A combination as set forth in claim 4 wherein said tubular support member, said bracket, and the half shaft bearing support are cast as a single, integral piece.

6. A combination as set forth in claim 4 wherein the half shaft bearing support is mounted to the engine.

* * * * *